US007930064B2

(12) United States Patent
Popovich, Jr. et al.

(10) Patent No.: US 7,930,064 B2
(45) Date of Patent: Apr. 19, 2011

(54) AUTOMATED DRUG DISCRIMINATION DURING DISPENSING

(75) Inventors: Joseph Popovich, Jr., McMurray, PA (US); Michael L. Jordan, Alpharetta, GA (US)

(73) Assignee: Parata Systems, LLC, Morrisville, NC (US)

( * ) Notice: Subject to any disclaimer, the term of this patent is extended or adjusted under 35 U.S.C. 154(b) by 1210 days.

(21) Appl. No.: 11/283,327

(22) Filed: Nov. 18, 2005

(65) Prior Publication Data

US 2006/0124656 A1 Jun. 15, 2006

Related U.S. Application Data

(60) Provisional application No. 60/629,452, filed on Nov. 19, 2004.

(51) Int. Cl.
*G06F 17/00* (2006.01)

(52) U.S. Cl. ............ 700/244; 700/232; 700/236; 221/2; 221/9

(58) Field of Classification Search .......... 700/231–244; 221/1–312 C
See application file for complete search history.

(56) References Cited

U.S. PATENT DOCUMENTS

| | | | |
|---|---|---|---|
| 4,223,751 | A | 9/1980 | Ayers et al. |
| 4,695,163 | A | 9/1987 | Schachar |
| 5,337,902 | A | 8/1994 | Evans et al. |
| 5,337,919 | A | 8/1994 | Spaulding et al. |
| 5,504,332 | A | 4/1996 | Richmond et al. |
| 5,597,995 | A | 1/1997 | Williams et al. |
| 5,679,954 | A | 10/1997 | Soloman |
| 5,768,327 | A | 6/1998 | Pinto et al. |
| 5,826,696 | A | 10/1998 | Rupp et al. |
| 5,884,806 | A | 3/1999 | Boyer et al. |
| 5,907,493 | A | 5/1999 | Boyer et al. |
| 5,960,098 | A | 9/1999 | Tao |

(Continued)

FOREIGN PATENT DOCUMENTS

EP 0 452 905 A1 10/1991

(Continued)

OTHER PUBLICATIONS

Pat Reynolds, Electrostaticosensing, Retrieved Nov. 17, 2004 from Internet Site http://www.dtindustries.com/packaging/packworldstory.asp, p. 1 of 1, DT Packaging Systems Industries.

(Continued)

*Primary Examiner* — Gene Crawford
*Assistant Examiner* — Michael K Collins
(74) *Attorney, Agent, or Firm* — Myers Bigel Sibley & Sajovec

(57) ABSTRACT

The automated drug discrimination system inspects the drug being dispensed during the dispensing process so that the pharmacist can be certain the correct formulation, dosage and quality of pharmaceuticals were dispensed so the pharmacist does not need to spend as much time examining the dispensed drug. The pills are dispensed through a dispensing area using a dispensing apparatus and are collected in a collection area. At least two sensors take a plurality of measurements of an aggregate of the pills during the dispensing process or of each pill as it moves through the dispensing area. A discrimination system compares the measurements taken to verify that the pills dispensed are the type of pharmaceuticals intended to be dispensed as identified in the individual prescription for at least one of formulation and dosage of the pill.

51 Claims, 4 Drawing Sheets

U.S. PATENT DOCUMENTS

| | | | | |
|---|---|---|---|---|
| 6,363,687 | B1 * | 4/2002 | Luciano et al. | 53/55 |
| 6,364,517 | B1 | 4/2002 | Yuyama et al. | |
| 6,471,088 | B1 | 10/2002 | Uema et al. | |
| 6,497,342 | B2 | 12/2002 | Zhang et al. | |
| 6,509,537 | B1 | 1/2003 | Krieg et al. | |
| 6,522,945 | B2 | 2/2003 | Sleep et al. | |
| 6,535,637 | B1 * | 3/2003 | Wootton et al. | 382/190 |
| 6,607,094 | B2 * | 8/2003 | MacDonald | 221/121 |
| 6,690,464 | B1 | 2/2004 | Lewis et al. | |
| 6,771,369 | B2 * | 8/2004 | Rzasa et al. | 356/326 |
| 6,919,556 | B1 | 7/2005 | Laurence | |
| 7,006,214 | B2 | 2/2006 | Rzasa et al. | |
| 7,028,723 | B1 | 4/2006 | Alouani et al. | |
| 7,080,755 | B2 | 7/2006 | Handfield et al. | |
| 7,099,741 | B2 | 8/2006 | Baranowski | |
| 7,139,639 | B2 * | 11/2006 | Broussard et al. | 700/225 |
| 7,218,395 | B2 | 5/2007 | Kaye et al. | |
| RE40,453 | E * | 8/2008 | Lasher et al. | 53/411 |
| 2003/0176942 | A1 | 9/2003 | Sleep et al. | |
| 2004/0004085 | A1 | 1/2004 | Williams et al. | |
| 2004/0104241 | A1 | 6/2004 | Broussard et al. | |
| 2004/0133705 | A1 | 7/2004 | Broussard et al. | |
| 2004/0207842 | A1 | 10/2004 | Rzasa et al. | |
| 2005/0004495 | A1 | 1/2005 | Goswami | |
| 2005/0288906 | A1 | 12/2005 | Drennen, III et al. | |
| 2006/0041330 | A1 * | 2/2006 | Ansari et al. | 700/240 |
| 2007/0093932 | A1 * | 4/2007 | Abdulhay et al. | 700/231 |
| 2007/0150092 | A1 * | 6/2007 | Ohmura et al. | 700/231 |
| 2008/0061074 | A1 * | 3/2008 | Remis et al. | 221/69 |

FOREIGN PATENT DOCUMENTS

| | | | |
|---|---|---|---|
| EP | 0 656 200 | A2 | 6/1995 |
| WO | WO 99/61324 | | 12/1999 |
| WO | WO 02/069897 | A2 | 9/2002 |
| WO | WO 2004/072868 | A1 | 8/2004 |
| WO | WO 2005/031302 | A2 | 4/2005 |

OTHER PUBLICATIONS

Morisseau et al., Pharmaceutical Uses of Near-Infrared Spectroscopy, 1995, pp. 1071-1090, Drug Development and Industrial Pharmacy.

Polli et al., Technology Vs Fake Drugs, Retrieved Oct. 27, 2005 from Internet Site http://www.uspharmacist.com/index.asp?show=article&page=8_1220.htm, pp. 1-2, U.S. Pharmacist.

Alexander et al., New Technologies Forum 4: Process Measurement and Control, Date Unknown, pp. 1-18, Royal Pharmaceutical Society.

Medical News Today, US Patent Issued for Unique Prescription Verification Solution, Aug. 13, 2004, p. 1 of 1, Medical News Today.

P.A. Hailey, The Role of NIR Spectroscopy in the Measurement of Pharmaceutical Manufacture, Retrieved Oct. 27, 2005 from Internet Site http://www.brimrose.com/hailey.html, pp. 1-6, Brimrose.

Parmeter et al., Guide for the Selection of Drug Detectors for Law Enforcement Applications NIJ Guide 601-00, Aug. 2000, 64 pages, National Institute of Justice.

Spectrolab Life Sciences, DASI—A Unique Hand Carried Analyser for Drug Identification & Molecular Analysis, Date Unknown, p. 1 of 1, Spectrolab Life Sciences, Internet Site www.spectrolab.co.uk.

Tony Lam, A New Era in Affordable Raman Spectroscopy, Jun. 2004, pp. 30-36, Raman Technology for Today's Spectroscopists.

Chris Frank, Raman Analysis in Pharmaceuticals, Sep. 1998, pp. 1-4, Raman Review.

Choi et al., Spatially Resolved Broad-Band Dielectroscopy for Material Characterization, Jan. 30, 2001, pp. 1-11, Chemical & Fuels Engineering, University of Utah.

Burns et al., NIR Analysis of Pharmaceuticals, 1992, vol. 13, pp. 549-563, Marcel Dekker, Inc., New York, New York, USA.

Journal of Pharmaceutical Sciences, Near-Infrared Spectroscopy and Imaging for the Monitoring of Powder Blend Homogeneity, Journal, Sep. 2001, vol. 90, No. 9, pp. 1298-1307, Journal of Pharmaceutical Sciences.

Analyst, Application of Near-Infrared Reflectance Spectrometry to the Analytical Control of Pharmaceuticals: Ranitidine Hydrochloride Tablet Production, Feb. 1996, vol. 121, pp. 219-222, Analyst.

James K. Drennen and Robert A. Lodder, Nondestructive Near-Infrared Analysis of Intact Tablets for Determination of Degradation Products, Jul. 1990, vol. 79, No. 7, pp. 622-627, Journal of Pharmaceutical Sciences.

Aldridge et al., Identification of Tablet Formulations Inside Blister Packages by Near-Infrared Spectroscopy, 1994, vol. 48, No. 10, pp. 1272-1276, Applied Spectroscopy.

Dempster et al., A Near-Infrared Reflectance Analysis Method for the Noninvasive Identification of Film-Coated and Non-Film Coated, Blister-Packed Tablets, 1995, pp. 43-51, Analytica Chimica Acta 310.

Wu et al., Spectral Transformation and Wavelength Selection in Near-Infrared Spectra Classification, 1995, pp. 243-255, Analytica Chimica Acta 315.

Kohn et al., Identification of Drugs by Near Infrared Spectra, 1992, vol. 37, No. 1, pp. 35-41, Journal of Forensic Sciences.

Dempster et al., Near-Infrared Methods for the Identification of Tablets in Clinical Trial Supplies, 1993, vol. 11, No. 11/12, pp. 1087-1092, Journal of Pharmaceutical & Biomedical Analysis.

MacDonald et al., Some Applications of Near-Infrared Reflectance Analysis in the Pharmaceutical Industry, 1993, vol. 11, No. 11/12, pp. 1077-1085, Journal of Pharmaceutical & Biomedical Analysis.

Lodder et al., Detection of Capsule Tampering by Near-Infrared Reflectance Analysis, Aug. 1, 1987, pp. 1921-1930, vol. 59, No. 15, American Chemical Society.

Presearch Limited, Technical Note N-DT-01 Statistical Analysis, Oct. 2002, pp. 1-5, Presearch Limited.

Pharmaceutical Analytical Sciences Group, Guidelines for the Development and Validation of Near Infrared (NIR) Spectroscopic Methods, Oct. 2001, pp. 1-41, Pharmaceutical Analytical Sciences Group.

Packaging Digest, Diverse Filling Line is Flexible and Fast, Retrieved Nov. 17, 2004 from Internet Site http://www.packagingdigest.com/articles/200305/36.php?footer_id=1, pp. 1-6, Packaging Digest.

Packworld.com, Automated Tablet Packing, New Line Helps Repackaging Pay Off, Retrieved Oct. 25, 2005 from Internet Site http://www.packworld.com/cds_print.html?rec_id=12789, pp. 1-4, Packworld.com.

Packworld.com, Electrostatic Sensing, Retrieved Oct. 25, 2005 from Internet Site http://www.packworld.com/cds_print.html?rec_id=12621, p. 1 of 1, Packworld.com.

Andrew Smith, What Really Counts is Separation, Sep./Oct. 2002, pp. 82-88, Machinery Update.

Nova Packaging Systems, New SV2 Intellisense, Retrieved Nov. 17, 2004 from Internet Site http://pei2004.packexpo.com/pei20004/packaging_suppliers/ve/37054/pr_63.html, p. 1 of 1, Nova Packaging Systems.

PCT International Search Report for PCT/US05/42342.

Supplemental European Search Report for EP 05 82 5091 dated Aug. 27, 2010.

* cited by examiner

AUTOMATED DRUG DISCRIMINATION DURING DISPENSING

RELATED APPLICATIONS

This application claims the benefit of U.S. Provisional Application No. 60/629,452, filed on Nov. 19, 2004, entitled "Apparatus and Method for Drug Discrimination," the entire disclosure of which is hereby incorporated by reference herein in its entirety for all purposes. This application is related to the following co-pending patent applications, each of which is hereby incorporated by reference herein in its entirety: U.S. patent application Ser. No. 10/423,579, filed on Apr. 25, 2003, entitled "Prescription Filling Apparatus Implementing a Pick and Place Robot," U.S. patent application Ser. No. 10/423,331, filed on Apr. 25, 2003, entitled "Vacuum Pill Dispensing Cassette and Counting Machine," U.S. patent application Ser. No. 10/637,775, filed on Aug. 8, 2003, entitled "Dispensing Device Having a Storage Chamber, Dispensing Chamber and a Feed Regulator Therebetween," U.S. patent application Ser. No. 10/637,867, filed on Aug. 8, 2003, entitled "Secure Medicament Dispensing Cabinet, Method and System."

BACKGROUND OF THE INVENTION

1. Field of the Invention

This invention pertains in general to drug discrimination, and more specifically to automated inspection of pharmaceuticals to verify formulation, dosage, and physical conditions during an automated dispensing process in a retail distribution environment.

2. Description of the Related Art

The current mode of operation for many pharmacies is that pharmaceuticals must be manually loaded into an automated dispensing system, which is then used to dispense individual prescriptions. Because humans are involved, it is possible to load the wrong drug into the wrong automated dispenser. It is also possible to dispense a drug into the wrong vial or bottle, depending on the type of automation used. As a result, most states require a pharmacist or someone working under the supervision of a pharmacist to be involved to provide the necessary verifications at some point in the process. Most retailers are busy enough that multiple people are required to handle the volume of prescriptions that are filled in a typical day. Thus, these verifications are both time-consuming and costly, requiring the time of pharmacists that could be better used elsewhere in the pharmacy environment. In addition, pharmacies also face problems with the possibility of pharmaceutical tampering and the production of counterfeit drugs that can be accidentally allowed to enter the distribution stream. Thus, pharmacies need a verification process that can also reliably detect these counterfeit drugs and prevent their entry into the market.

Rather than involving humans extensively in the verification process, it would be useful to have an additional high quality check in the pharmacy workflow, thereby further decreasing the possibility of an incorrect drug being dispensed. Currently, technology is available for automated inspection of pharmaceuticals after the pills have been placed into the vial for distribution. However, the data collected commonly examines only a single pill or pills in the top layer of pharmaceuticals dispensed into the vial, thus missing the entire collection of pills below the top layer. While the data collected may be reliable, only a small portion of the dispensed drug has actually been considered and verified. Current methods do not allow assessment of each pill dispensed without disrupting the prescription fulfillment process.

Furthermore, some technologies require that the pills be positioned in a particular orientation to the sensor for the measurements to be taken, thus making it difficult to reliably get accurate measurements of the pharmaceutical dispensed. Therefore, technologies used today for pharmaceutical verification include a number of drawbacks with regard to the types of data collected, the percentage of dispensed pills that are analyzed, the reliability of the measurements taken, and a number of other areas.

SUMMARY OF INVENTION

A drug discrimination system verifies dispensed pharmaceutical formulation, dosage and/or physical conditions of the entire contents of each prescription as it is being filled during the dispensing process. In one embodiment, a pharmaceutical dispensing apparatus dispenses pharmaceutical pills into a dispensing area. A pharmaceutical collection area collects the pharmaceutical pills dispensed from the dispensing area in a dispensing process. At least two sensors adjacent to the dispensing area take multiple measurements of an aggregate of the pharmaceutical pills as the aggregate is collected in the collection area during the dispensing process; the aggregate being formed is the collection of pills needed for an individual prescription and can be as few as a single pill. The measurements can be taken without requiring the pills to be in a predetermined fixed position or orientation. A discrimination system compares the measurements to stored pharmaceutical models to verify that characteristics of the aggregate substantially match the stored characteristic models of pills identified in the individual prescription. Once the aggregate is verified, it can be passed through to capping, labeling and other operations conducive to completion of the prescription filling.

In one embodiment of the drug discrimination system, the pills travel through the dispensing area, e.g., by moving from the reservoir through the dispensing area and into the collection area where they form a pill aggregate. The collection area can be either a vial or other container that will contain the individual aggregate itself either temporarily or in a container that is provided to a patient or customer, or a gated receptacle that temporarily holds the pill aggregate during the verification process. At least one of the at least two sensors can be positioned and focused or calibrated, and the at least one sensor can take a measurement of each of the pills as each is traveling through the dispensing area. The discrimination system compares the measurements with one or more stored models associated with the pills to verify that a characteristic of each of the pills dispensed substantially matches the stored characteristic model(s) of pills identified in the individual prescription.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
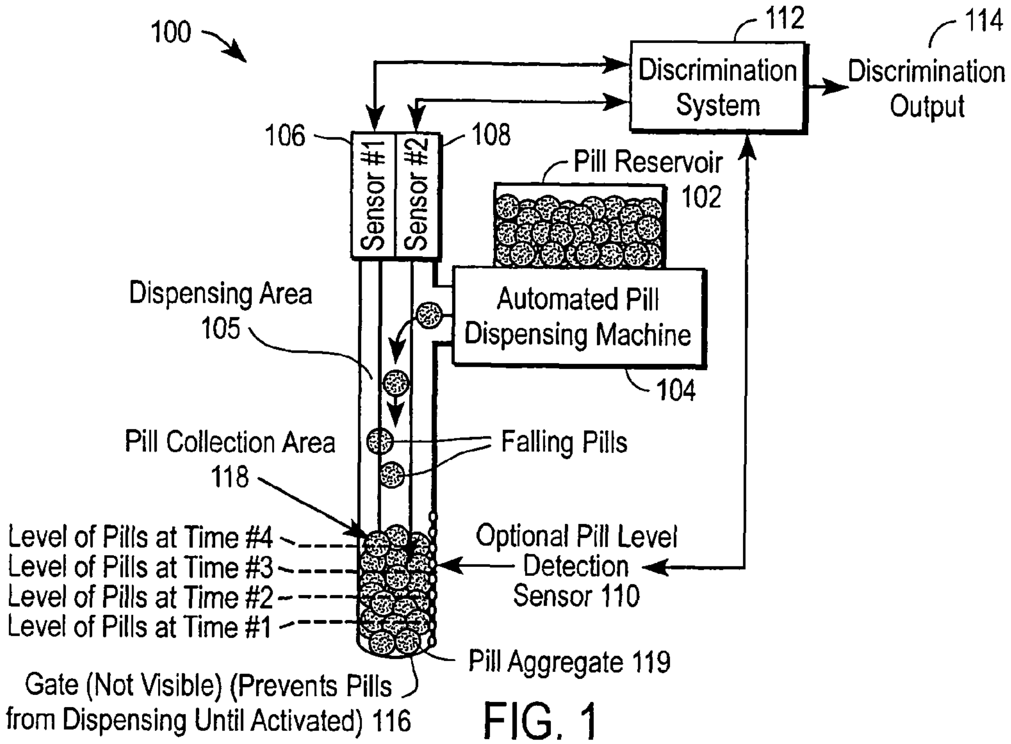
FIG. 1 is a diagram of the drug discrimination system 100, according to one embodiment of the present invention.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

An automated drug discrimination system inspects the pills included in each prescription, as each individual prescription is being dispensed so that the pharmacist can be certain the correct formulation, dosage and/or quality of pharmaceuticals were dispensed in the individual prescription. Thus, the pharmacist does not need to spend as much time examining the dispensed drug (which is a potential cost savings as well as a time savings, allowing the pharmacist to spend more time counseling patients). The reliability of the drug discrimination system is greater than the reliability of employing only human inspection. In addition, the system can be implemented in a manner that performs a quality inspection of every pill that is dispensed. In the context of this disclosure, the term "pill" is understood to refer to any type of substance for treatment or prevention of an illness or condition, which can take any form, such as a pill, tablet, capsule, gelcap, vial, ampule, patch, and so forth.

The drug discrimination system uses at least two sensors that take data to verify that each dispensed pill in a pharmaceutical prescription is the correct formulation and/or dosage for that prescription by taking sets of sensor data to make those determinations to a desired degree of accuracy. The sensors can take multiple readings of a number of pills as they travel into a collection area, or of the pill aggregate itself at any given time. The multiple readings may be accomplished in various ways (e.g., by positioning the sensors to acquire data from multiple views of the pills or pill aggregate, by collecting data at different points in time, etc.). The sensor data can be collected in real time as the pills are traveling so that readings are being taken while the system is still in the act of dispensing (e.g., there does not have to be a delay while waiting for the analysis to be completely finished). Other additional quality checks, such as the amount of pill fragmentation may be performed in some embodiments based on the collected data. Pill aggregates containing incorrect or damaged pharmaceuticals can be flagged for the pharmacist to review before they are released to a customer.

In some embodiments, at least two sensors are used to verify drug formulation, dosage and general overall quality for the large number of available pharmaceuticals. The sensors collect multiple readings of different types of sensed data which enables the necessary pharmaceutical verifications to be made with a desired degree of accuracy. The placement of the sensors is relative to the dispensing area so as to take measurements of the pill aggregate as it is being formed (e.g., at different points in time while the collection area is being filled), and optionally of each pill as it travels through the dispensing area which allows for repetitive measurements, and eliminates the requirement that the pills be presented to the sensors in a particular predetermined, fixed position or orientation. The embodiments described below are examples of how the drug discrimination system can be constructed such that desired verifications are performed without requiring a predetermined, fixed pill orientation as the pill moves through the dispensing process. The drug discrimination system can include a variety of combinations of sensors positioned in various locations, dependent upon the types of sensor selected, thereby providing flexibility with regards to the nature of the equipment into which the system is integrated. Thus, the integration of the invention is not limited by the style of machine or dispensing technology.

Referring now to FIG. 1, there is shown a drug discrimination system 100 for verifying dispensed pharmaceutical formulation, dosage and physical conditions, according to an embodiment of the invention. The system 100 illustrated in FIG. 1 includes an automated pill dispensing machine, 104, a dispensing area 105, a pill reservoir 102, a pill collection area 118, sensors 106, 108, a discrimination system 112 and discrimination output 114, a gate 116, and an optional pill level detection sensor 110.

The pill reservoir 102 stores a supply of pills for prescriptions. The automated pill dispensing machine 104, coupled to the reservoir, dispenses individual ones of the pills in an individual prescription into and through a dispensing area during the dispensing process. The dispensing area can be a volume of space, a slide or chute that pills slide down, a conveyor or belt, a horizontal flat or curved surface, and any combination of these or other designs. The reservoir 102 can be any type of container for storing pharmaceuticals and can have any shape or size (e.g., the rectangular box shape illustrated in FIG. 1, a circular or cylindrical shape, etc.), or the pills could be provided to the automated pill dispensing machine 104 in another manner that does not require a reservoir 102 to be included in the system. Additionally, pills could be added manually to the automated pill dispensing machine 104. The automated pill dispensing machine 104 draws pills from the reservoir 102 that are counted to fill individual prescriptions. The automatic pill dispensing machine 104 can be a single stand alone unit, it may be one of many automated modules contained in the apparatus 100, or it may be part of a robotic automation solution. For each prescription to be filled, the automated pill dispensing machine 104 dispenses a number of pills according to a command input derived from the details of the current prescription (e.g., a prescription specifying a number of pills to be dispensed, such as 10 pills, 100 pills, and the like results in an input command to the dispensing machine to dispense the specified number of pills).

A pill collection area 118 collects the pills dispensed through the dispensing area (connected between the dispensing apparatus and the collection area) for the individual prescription. After each pill is output from the automated pill dispensing machine 104, the pill is collected in the collection area 118 during the dispensing process into a pill aggregate 119 in the pill collection area 118 to be dispensed in the individual prescription. In one embodiment, the pill collection area 118 is a chute, funnel, cylinder or similar structure adapted to temporarily hold the aggregate as it is being formed before final release into a vial, bottle, or other packaging (not shown). In this embodiment, the pills in the aggregate 119 are prevented from moving past the pill collection area 118 by a gate 116 that holds the pills in place until the gate 116 is activated or opened to release the pills. The temporary container could also be a vial, bottle or other type of container without a gate into which the pills are dispensed and held temporarily before being transferred to the final vial, bottle or container in which they are transferred to the customer. In other embodiments, the pill collection area 118 is the vial or bottle for the drug into which the pills are counted directly rather than first being counted into a temporary container or chute.

At least two sensors 106, 108 adjacent to dispensing area 105 and directed at the pill collection area 118 take a plurality of measurements of the aggregate of pills at one or more times during the dispensing process for the individual prescription. In the embodiment of FIG. 1, the sensors 106, 108 are illustrated for use in verifying the pharmaceutical formulation and/or dosage. Alternatively, sensors 106, 108 can be replaced with other sensors for performing other analyses of physical conditions. Furthermore, other sensors in addition to sensors 106, 108 can be included to perform other quality verification or analysis. The sensors 106, 108 can be complimentary sensors and can be the same type of sensor for performing similar analyses (e.g., two spectrometers). Two similar sensors can be used to provide different views, for example. The sensors 106, 108 can also each be different types of sensors (e.g., a spectrometer and a camera).

In addition, the sensors 106, 108 can be moved to locations other than those shown in FIG. 1, as appropriate, and depending upon the type of sensor being used. Furthermore, one or both of the sensors 106, 108 can be moved around during or after dispensing (e.g., if the picture produced by the sensor is not very good, the sensor can be moved to obtain a better picture, or the sensor data obtained from one sensor can be used to better position the second sensor as the pills are dispensed). Furthermore, in some embodiments, the measurements taken by the sensors 106, 108 are taken physically and temporally near the pill collection area 118. Thus, the measurements can be taken at a location that is substantially adjacent to the pill collection area, rather than at a location in the process that is further upstream from the pill collection area 118. The measurements can also be taken at a point in time during the dispensing process that is substantially near the point in time at which the pills enter the aggregate, rather than being taken at a point in time that is further upstream in the process. An example of different types of sensors that can be used in pharmaceutical analysis is included in the article by John E. Parmeter, et al. of the National Institute of Justice, Law Enforcement and Corrections Standards Testing Program, "Guidelines for the Selection of Drug Detectors for Law Enforcement Applications, NIJ Guide 601-00," (2000), which is hereby incorporated by reference herein for all purposes.

A discrimination system 112 compares the plurality of measurements taken by the sensors 106, 108 to one or more stored pharmaceutical models to verify that one or more of a plurality of characteristics of the aggregate 119 substantially matches the stored model(s) of pills identified in the individual prescription for the at least one of formulation and dosage of the pills in the aggregate 119. Thus, the sensors 106, 108 take multiple measurements that are used by the discrimination system 112 to verify that the pills actually dispensed match a characteristic of the type of pills that the machine 104 was commanded to dispense according to the prescription (e.g., the pills have characteristics that match the drug Motrin® if that is the drug the pharmacist intended to dispense). The characteristics of the pharmaceuticals can include any characteristic found in drugs, such as the formulation, dosage, weight, appearance, shape, size, volume, surface composition, density, color, markings, and so forth. This data can also be used to draw conclusions, such as whether the pill is broken, fragmented, or damaged in some other way, whether it is the correct pill, whether extraneous material has been introduced into the dispensing process (e.g. desiccant or other non-pharmaceutical item), etc. Examples of stored models or libraries of pill characteristics, how pharmaceuticals can be identified by comparison to the libraries, and of analysis of spectroscopic data, in general, are described in the article by the Pharmaceutical Analytical Sciences Group, entitled "Guidelines for the Development and Validation of Near Infrared (NIR) Spectroscopic Methods," (2001), which is incorporated by reference herein in its entirety for all purposes.

In one embodiment of system 100 shown in FIG. 1, sensor 106 is a spectrometer (e.g., a high accuracy spectrometer) and sensor 108 is a camera, but these sensors can be exchanged for other types of sensors, as desired. The pair of sensors 106, 108 provides a combination of the data that allows for determination of pharmaceutical formulation and dosage. Other sensor combinations could have been selected which would achieve the same result. For example, since many pills of the same formulation and different dosages can be discriminated based on differences in size or weight, the camera of sensor 108 can be a sensor(s) that can accurately measure the pill volume (such as an E-field sensor) or weight (such as a scale). The camera of sensor 108 can also provide other information, such as information regarding the size, volume of the pills, and so forth. In addition, a camera can also determine dosage based on size differences (e.g., since the difference between pills of the same formulation and different strengths can be a difference in pill size). In this example, the spectrometer of sensor 106 would verify the formulation, and the combination of the weight scale and E-field sensor would verify dosage. While other types of sensors can be selected, the selecting of other types of sensors may require the sensors to be placed in alternate locations in the figure or otherwise be arranged differently (e.g., a weight sensor might be placed under the pill aggregate 119).

In the embodiment described above, the spectrometer of sensor 106 verifies the pharmaceutical formulation of the drug. In some embodiments, the spectrometer can verify dosage of the drug. In some embodiments, the spectrometer is either a near-infrared reflectance spectrometer ("NIR") or Raman spectrometer, since these technologies are useful across a wide number of drugs. An example of the usage of NIR spectroscopy in pharmaceutical analysis and the processes involved is described in the article by Emil W. Ciurczak, entitled "NIR Analysis of Pharmaceuticals," found in Burns, D. A. and E. W. Ciurzak, "Practical Spectroscopy Series," "Handbook of Near Infrared Analysis," XVII, page 549, vol. 13 (1992), which is incorporated by reference herein in its entirety for all purposes. An example of the usage of Raman spectroscopy in pharmaceutical analysis and the processes involved is described in the article by Tony Lam, "A New Era in Affordable Raman Spectroscopy," Raman Technology for Today's Spectroscopists, page 30-37 (2004). In other embodiments, the spectrometer is a dielectric or acoustical spectrometer, or another type of spectrometer. As is known to those of ordinary skill in the art, the spectroscopic technology selected is a function of the pharmaceuticals that will be examined and the other sensors that will be utilized to help the overall drug discrimination system determine the formulation and/or dosage. Thus, one of ordinary skill in the art would know, based on the type of pharmaceuticals being examined, the types of spectroscopic technologies that can be used and/or matched to perform the desired analyses.

In the embodiment described above, the spectrometer (e.g., where sensor 106 is a spectrometer) obtains multiple spectral curves of the pill aggregate 119 from multiple readings of the aggregate 119 as the aggregate 119 is being formed and compares the spectral curves against archived spectra associated with the particular pharmaceutical of interest. For example, a library of spectra and other information about the various types of pharmaceuticals can be stored either within the system 100 or in a separate storage location accessible by the system 100. The discrimination system 112 compares the measurements taken during the dispensing process using sensors 106 and 108 to the library information for the pharmaceutical that is intended to be dispensed. Using standard chemometric techniques for analyzing spectroscopic data (e.g., Multivariate Classification techniques, such as Principal Component Analysis ("PCA"), Soft Independent Modeling of Class Analogies ("SIMCA"), and k-Nearest Neighbor ("kNN"), and the like), software that resides in the discrimination system 112, shown in FIG. 1, then allows verification of the pill formulation with a high degree of accuracy and confidence and produces an output 114 that can provide information regarding the formulation of the pills being dispensed (e.g., what is the formulation, how close is the formulation to the intended pharmaceutical formulation, what is the confidence level, and the like).

The sensor 108 can verify dosage in those instances where the formulation is available in different dosages, in the embodiments described above. In an embodiment where sensor 108 is a camera, this is done by taking at least one, and optionally a plurality of pictures of the pill aggregate 119 as it is being formed. For example, the camera 108 can take multiple pictures of the aggregate 119 of pills in the collection area 118, which changes as more pills are dropped so that the aggregate 119 at time 1 is different from that at time 2. The camera can take a picture of the aggregate 119 at time 1, time 2, time 3, time 4, etc. to obtain a different image of the aggregate 119 at each time as the collection area 118 is filling up with more pills. The spectrometer (e.g., sensor 106) can take multiple readings of the spectral data for the pill aggregate 119 in the same manner over time. Image analysis software, which can be part of the discrimination system 112, then extracts pill features that enable the drug discrimination system 100 to verify the dosage and other characteristics, such as formulation, for the current prescription. Again, an output 114 can be produced that provides information about the dosage, formulation, etc. of the pills being dispensed in the current prescription. Possible approaches to this feature extraction are disclosed in U.S. Pat. No. 6,535,637, filed on Jul. 30, 1998, entitled "Pharmaceutical Pill Recognition and Verification System," U.S. Pat. No. 4,759,074, filed on Oct. 26, 1986, entitled "Method for Automatically Inspecting Parts Utilizing Machine Vision and System Utilizing Same," U.S. Pat. No. 5,422,831, filed on Feb. 15, 1994, entitled "Acoustic and Video Imaging for Quality Determination of Pharmaceutical Products," which are hereby incorporated by reference in their entireties for all purposes. Other similar approaches may also be implemented.

Selecting a camera type for one of the sensors 106, 108 to verify dosage adds an additional implementation-specific option that can be enabled by the designer. The images of the pill aggregate 119 which are captured by the camera for drug discrimination purposes can also be output to a display unit (not shown) for review by the pharmacist to perform a visual inspection before (or after) the gate 116 releases the prescription into the vial or bottle. Additionally, one or more of the captured images for the pill aggregate 119 can be archived in association with the prescription information for later reference, such as auditing.

As shown in FIG. 1, it is possible for the two sensors 106, 108 to collect multiple, statistically independent sets of data while the pills are moving through the dispensing area 105 and accumulating at the gate 116. The readings are statistically independent in that if sensor 106 obtains bad or insufficient results from its measurements, sensor 108 could independently obtain good results. Since the sensors 106, 108 can be at different locations and can take different readings of the pill aggregate 119 or the pills traveling through the dispensing area 105 from different angles, the readings taken can vary in data content or quality. The system 100 can take a reading of the aggregate 119 after every pill is dropped, or after every 2 pills, 3 pills, 5 pills, 10 pills, or after any other desired number of pills. The sensors 106, 108 can collect whatever amount and type of data is desired, so the images could even be taken of every pill and data could be collected after each pill that moves onto the aggregate 119. For example, with an NIR sensor 106, there is a choice of how large of an area of pills to be imaged for measurement. A very small area that includes only one or a couple of pills per measurement or a large area that includes a group of pills could be used.

In addition to allowing for assessment of every pill dispensed in the prescription, there are other practical advantages to the approach of collecting data while pills are being dispensed. For example, the sensors 106, 108 can take measurements when the pills are at a level indicated by "time 1" in FIG. 1. At this point, the sensors 106, 108 can be calibrated or focused, if necessary, and then data can be collected and analyzed. If the sensors 106, 108 are unable to take measurements that allow determination of the formulation and/or dosage (or other characteristic) with a high degree of confidence, the system 100 can be adapted to wait a short period of time until an arbitrary level of pills at "time 2" is achieved after some additional pills have been added. The sensors 106, 108 then perform another calibration or focusing, if necessary, and collect new data. The sensors 106, 108 can collect data until the data quality is sufficient to verify the formulation/dosage with a high degree of certainty. In some embodiments, the sensors 106, 108 collect data regarding every pill in the aggregate.

In one embodiment, the pill singulation and data collection process are coordinated. In this case, pill singulation is halted for a number of milliseconds required for calibration and focusing (where necessary) of the sensors 106, 108 and for data collection. In addition, the rate at which readings are taken can be varied, with fewer readings or more readings taken depending on the time of the reading or the height of the aggregate 119. Alternatively, the reading rate can be the same as the rate of pill dispensing. Readings can be taken as every N number of pills are dispensed, where N can be equal to 1 or more pills. It is also possible to look at pills individually as they move using sensors appropriate for taking these types of readings (e.g., cameras, E field sensors or other sensors) to make sure each pill has the expected characteristics or that each pill being dispensed is the same as all others.

In some embodiments, the system 100 includes an optional pill level detection sensor 110. The level detection sensor 110 is used for example to speed the determination of camera focusing distance or sensor calibration, or to provide the signal of the height of the aggregate 119 to control the reading rate or time. There are multiple methods of implementing a pill level detection sensor 110 system, including the use of a capacitive sensor, a proximity sensor, an optical sensor array, or an E-field sensor. The pill level detection sensor 110 can establish where the top of the pill aggregate 119 is located. This information can then be continuously passed to a focus or calibrating control loop (not shown) for sensor 106 and/or sensor 108 so that the control loop can keep the sensors 106, 108 continually in focus or in calibration. The pill level information can also be used as a data collection trigger that indicates every time the pills reach a known level where the sensors 106, 108 need to collect data. This configuration enables the sensors to continuously take readings of the pills or the aggregate 119, if desired. Depending on what container or area the pills are collected into (e.g., a chute, a vial, etc.), the arrangement of the pill level detection sensor 110 relative to the container can be modified, as appropriate.

Another embodiment of system 100 locates a spectrometer such that each pill output by the automated pill dispensing machine 104 passes in front of the spectrometer as it travels through the dispensing area and before it drops onto the aggregate 119 in the pill collection area 118. In this embodiment, the spectrometer could verify the pill formulation, and this embodiment preferably uses additional automation structures that control the pill orientation in a manner that was compatible with the spectrometer requirements.

Figure 2:
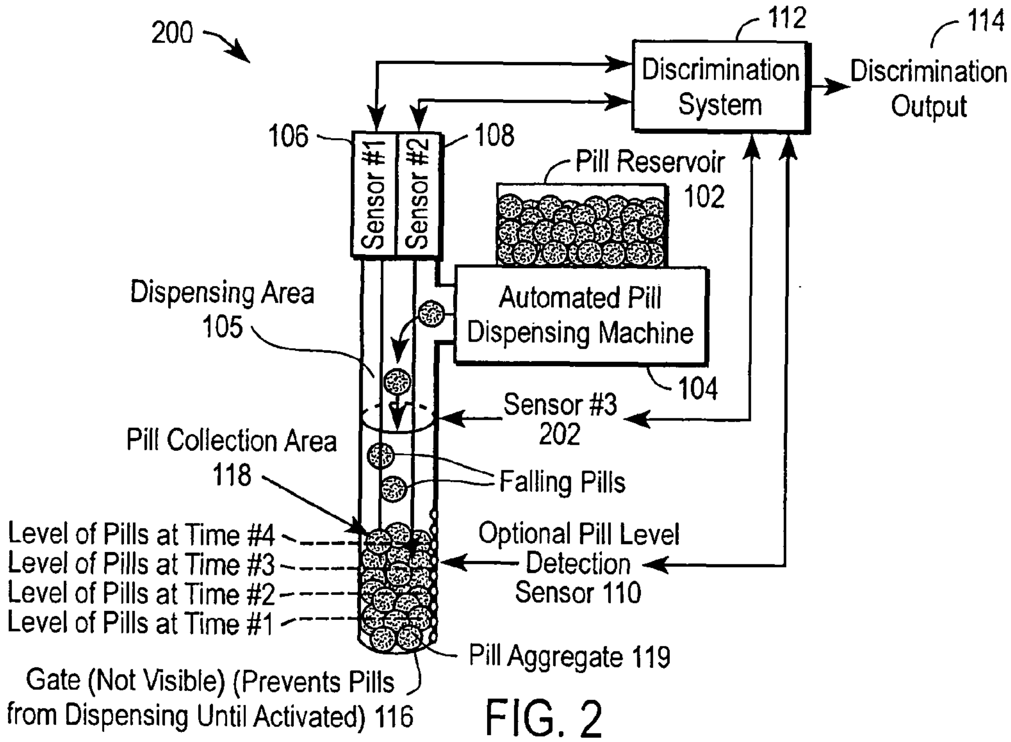
FIG. 2 is a diagram of the drug discrimination system 200, according to one embodiment of the present invention.
Figure 3:
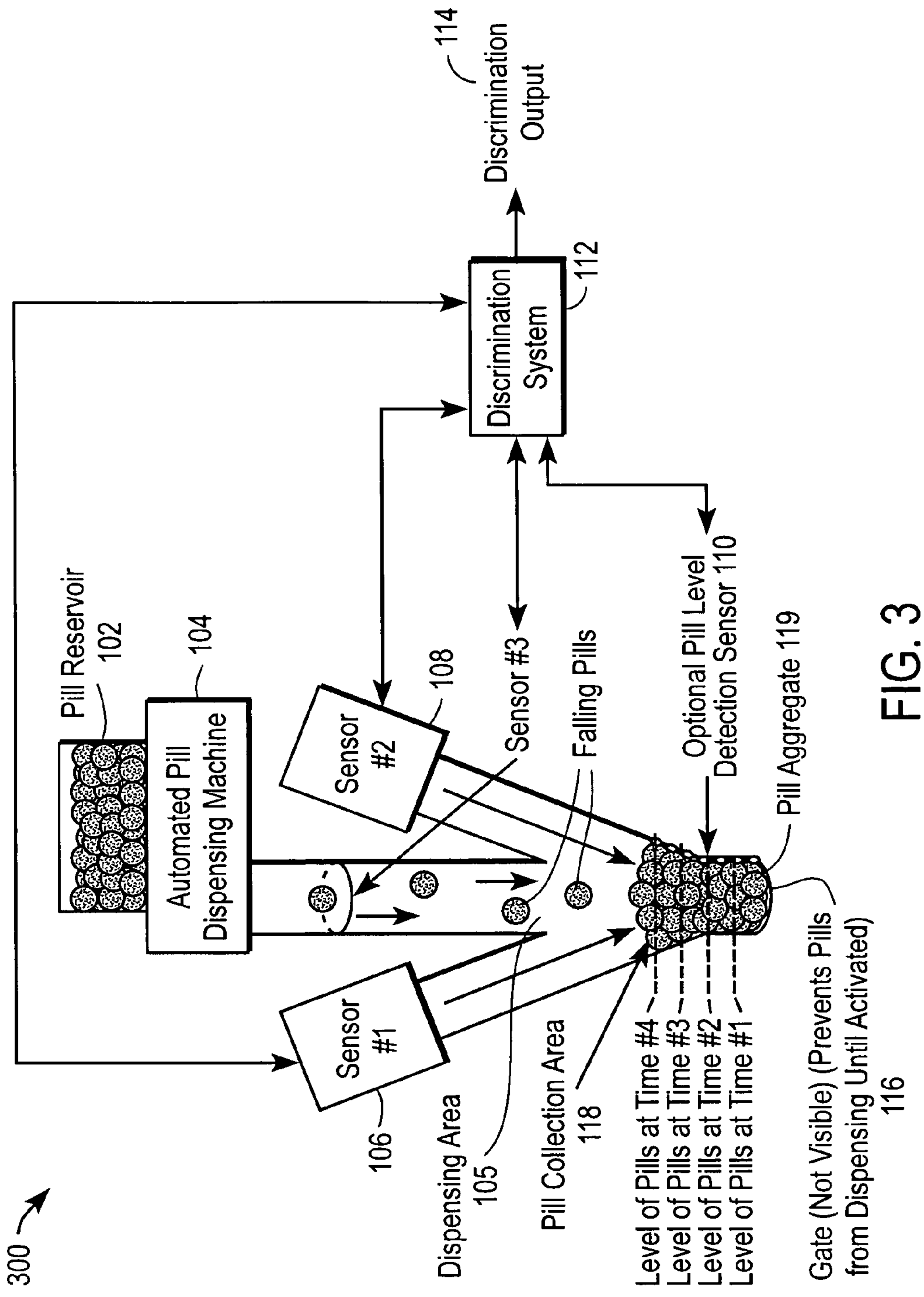
FIG. 3 is a diagram of the drug discrimination system 300, according to one embodiment of the present invention.

Referring now to FIGS. 2 and 3, there are shown drug discrimination systems 200 and 300 for verifying dispensed pharmaceutical formulation, dosage and physical conditions using three sensors, according to an embodiment of the invention. Sensor 202, illustrated in FIGS. 2 and 3, can be any type of sensor desired (e.g., a spectrometer, a camera, an E-field sensor, etc.). The sensor 202 can be the same as or different from the sensors 106 and 108. Sensor 202 can be positioned under the automated pill dispensing machine 104 so that pills dispensed will move near or through sensor 202 or a field created by sensor 202. The systems 200 and 300 illustrated in FIGS. 2 and 3 include various components, similar to system 100, such as an automated pill dispensing machine, 104, a dispensing area 105, a pill reservoir 102, a pill collection area 118, sensors 106, 108, 202, a discrimination system 112 and output 114, a gate 116, and an optional pill level detection sensor 110.

Similar to system 100, systems 200 and 300 include a reservoir 102 for storing a supply of pills for prescriptions and an automated pill dispensing machine 104 for dispensing individual ones of the pills in an individual prescription into and through the dispensing area 105 during the dispensing process. A pill collection area 118 collects the pills dispensed through the dispensing area 105 for the individual prescription. The pills collected during the dispensing process form an aggregate 119 to be dispensed in the individual prescription. Also similar to system 100, systems 200 and 300 include at least two sensors adjacent to the dispensing area for taking a plurality of measurements of the pills during the dispensing process. In one embodiment, at least one of the sensors (or possibly a third sensor 202) takes a measurement of each of the pills as each is moving through the dispensing area 105. For example, sensor 202 is configured to take a measurement of each pill as it moves through the dispensing area, prior to the pill moving onto the aggregate 119. As another example, at least one of sensors 106 or 108 can be configured to take a measurement of each pill as it moves through the dispensing area. In the embodiments of FIGS. 2 and 3, the discrimination system 112 can compare the measurements taken to one or more stored models to verify that a plurality of characteristics of each of the pills dispensed substantially matches the stored characteristic models of pills identified in the individual prescription for the formulation, type, dosage, etc. of the pill.

In the embodiment illustrated in FIG. 3, sensors 106 and 108 are positioned in a different manner than in systems 100 and 200. In FIG. 3, rather than being positioned directly above the pill collection area 118, the sensors 106, 108 are positioned at an angle that is offset from the pill collection area 118. Thus, the readings taken by the sensors 106, 108 are taken at an angle to the pill collection area 118 (the angle can be varied, as needed). In some embodiments, the sensors 106, 108 are positioned on either side of the sensor 202 and/or are positioned on either side of the area from which pills are dispensed from the automated pill dispensing machine 104.

In some embodiments, the sensor 202 is selected for measuring of the volume of each individual pill as it moves past the sensor 202. In some cases, sensors for determining volume measurements can be used to verify the dosage of many pills, since it is common that the difference between two pills of the same formulation and different strengths is a difference in pill size. For example, a 20 mg pill dosage might be twice as large as a 10 mg dosage. One of ordinary skill in the art would know how to properly select sensor 202 so that a simple voltage measurement is all that is required to detect this difference in pill size. In contrast, where a camera and imaging algorithm are used to determine pill size from an image of a collection of pills, none of the pills may be optimally oriented to obtain this information. The addition of this sensor 202 simplifies the imaging algorithms that would otherwise need to be integrated with the camera sensor as compared to the instance where a camera is relied upon for the determination of pill size from an image of a collection of pills where none of the pills may be optimally oriented to obtain that information. The camera may still be used to distinguish between pills of the same formulation and size, but having different dosages. However, because certain of the pills may have their size determined by data from sensor 202, the number of cases that need to be discriminated by the camera is reduced, thereby simplifying the image recognition algorithms.

In addition, sensor 202 can be used for cross-checking of data. For example, data from both sensor 202 and a camera (e.g., sensor 108) may be relied upon to determine size, thereby increasing the accuracy of the system.

Furthermore, sensor 202 (or sensors 106 or 108) can be used to perform a volume measurement that enables each pill to be individually examined so that it can be determined if the pill is fragmented, broken or otherwise damaged, if the pill is the correct shape, etc. One of ordinary skill in the art would know how to select the proper sensor technology (e.g., E-field based) for sensor 202 so that pill fragmentation can be detected (e.g., pill fragmentation of as little as 3%). In addition, it is also possible to detect the presence of single "contaminating" pills amidst other correct pills, as well as to detect foreign materials (such as desiccant packages, etc.).

Sensor 202 can further be used to extract pill-specific spectroscopic data. The value of pill-specific spectroscopic data will be discussed later.

In some embodiments, sensor 202 is either an E-field or electrostatic sensor. These sensors work by establishing an electric field that the pill will drop through. As the pill enters the sensor field, the sensor field is then measurable altered as function of the dielectric constant of the pill, the pill volume, the sensor geometry, pill geometry, and field frequency. In this embodiment, the sensor 202 geometry is constructed so that the sensor 202 can determine the pill volume independent of the pill orientation as the pills pass by the sensor 202. More specifically, the sensor 202 can verify pill size and amount of pill fragmentation by performing a dielectric impedance measurement (e.g., a simple voltage threshold measurement). An example of the use of E-field or capacitive sensing with regard to pharmaceutical analysis is included in U.S. Pat. No. 5,337, 902, filed on Aug. 13, 1993, entitled "Tablet Sensor," which is hereby incorporated by reference herein in its entirety for all purposes.

E-field or electrostatic sensors can also provide a spectroscopic output (e.g., dielectric spectroscopy). One of ordinary skill in the art would recognize that it is possible to get multiple voltages across multiple frequencies. The spectral lines are not as distinct as can be obtained using other types of spectroscopy, such as NIR or Raman, but they can be useful. Dielectric spectroscopy is much more forgiving with regards to necessary pill presentation than most other types of spectroscopy. With dielectric spectroscopy, data can be collected while pills are moving, without regard to pill orientation. NIR and Raman spectroscopy require a much more controlled pill presentation.

Utilizing dielectric spectroscopy to obtain individual spectra provides additional benefits. Individual pill measurements can be compared against archived measurements while the pill aggregate 119 is forming to determine that the data for a given pill are within a nominal range for the formulation, and thereby to verify that a stray bad pill or desiccant was not dispensed in the current prescription and then missed when the spectrometer (e.g., sensor 106) examined the pill aggregate 119. Another possible way to use the individual pill spectra is to compare the individual pill spectra of each pill in the current aggregate 119 against each other pill instead of matching them against a reference spectrum. Again, this is a way to ensure that all of the pills in the current prescription are nominally the same composition. The spectrometer (e.g., a high accuracy spectrometer) can then determine the exact formulation by inspecting the aggregate 119 of pills of the current prescription.

Pharmacy workflow can be improved using the systems, 100, 200, and 300. For example, the systems 100, 200, and 300 can be integrated with pharmacy workflows, such as those described in U.S. Pat. No. 5,597,995, filed on Nov. 8, 1995, entitled "Automated Medical Prescription Fulfillment System having Work Stations for Imaging, Filling, and Checking the Dispensed Drug Product," and U.S. patent application Ser. No. 10/637,768, filed on Aug. 8, 2003, entitled "Controller for Dispensing Products," both of which are hereby incorporated by reference herein in their entireties for all purposes. These patents also illustrate how prescription information initially enters the pharmacy workflow and gets to the pharmaceutical dispensing systems. Many pharmacies use automation that includes a robot that is used to fill prescriptions. In these types of systems, the prescription is entered into or sent to the robotic automation system. The robot usually takes an empty vial and adds a label specific to the prescription being filled. The automation then counts the requested amount of the requested medication into a holding chute or into the vial. The robot places the empty vial under the holding chute (where present), releases the medication into the vial, and places the vial in a holding area. Under some current systems, the pharmacist must collect the vial, read the label to determine what the medicine inside the vial should be and then look into the vial to determine if the medication matches the label. In some instances the pharmacist must actually dump a few of the pills into his hand so he can get a better look at the pharmaceutical before he can make this determination. If the systems 100, 200, or 300 were incorporated into the robotic automation system, this pharmacist-review step could be minimized or deleted, since the systems 100, 200, or 300 would review the dosage, formulation, etc. of the pills before dispensing into the vial to verify that the pills match the prescription intended to be dispensed.

The drug discrimination systems 100, 200, and 300 described herein can be integrated into this type of automated drug dispensing environment or other types of drug dispensing systems. For example, the drug discrimination systems 100, 200, and 300 can be integrated into automation equipment of the type disclosed in U.S. patent application Ser. No. 10/423,579, entitled "Prescription Filling Apparatus Implementing a Pick and Place Robot," filed Apr. 25, 2003 and published Feb. 19, 2004 (Publication No. 2004-0034447-A1), U.S. patent application Ser. No. 10/637,775, entitled "Dispensing Device Having a Storage Chamber, Dispensing Chamber and a Feed Regulator Therebetween," filed Aug. 8, 2003 and published May 27, 2004 (Publication No. 2004-0099683-A1) and U.S. patent application Ser. No. 10/637,867, entitled "Secure Medicament Dispensing Cabinet, Method and System," filed Aug. 8, 2003 and published Jun. 10, 2004 (Publication No. 2004-0108323-A1), all of which are hereby incorporated by reference in their entireties for all purposes. In these examples, the automation equipment scans the prescription label before releasing the verified drug from the chute or collection area 118 into the vial. If the requested medication for the current prescription, as indicated by the label on the vial (e.g., by barcode, RFID, etc.), matches the medication that was verified by the drug discrimination system 100, 200, or 300, the medication would then be released from the collection area 118 into the vial. That ensures that the verified drug is placed in a vial that has a matching, verified label.

Depending on the configuration of the automation equipment, the vial may then be capped and placed in an output lane or area. For example, it is possible to add a capper to a robotic operation so that the vial can be capped after the drug is verified and placed in a vial that has a verified label. The pharmacist can then collect the capped prescription. He knows the drug inside has been verified against the label on the vial. However, some automation is designed such that the pharmacist must manually place the vial under the dispensing chute and release the verified drug into the vial. In this situation, the pharmacist may cap the vial himself. If the drug discrimination system is one of the embodiments presented above which utilizes a camera as one of the sensors, then the system has captured an image of the medication that was dispensed. With the availability of such images, one embodiment utilizes the printer to print a picture of the drug that is in the vial, for example on the label for reference, as well as to keep an archive of the picture(s) of the drug for the pharmacy's records. Additionally, this embodiment outputs the picture(s) to a display screen where they can be compared (e.g., manually compared by the pharmacist) to a library reference image for the correct drug to provide an additional check without opening the vial. There is no need for the pharmacist to spend time looking inside the vial or dumping out some of the drug to perform an inspection, as would have been necessary without the drug discrimination system 100, 200, or 300.

If the requested medication, as indicated by the label on the vial, does not match the medication that was verified by the drug discrimination system 100, 200, or 300, or if verification was not made, or not made with the desired accuracy, several possible methods for handling such exceptions can be implemented. For example, the gate 116 is not opened and the medication is not released into the vial, and the pharmacy staff may be required to resolve the problem. As another example, the medication may be released by the gate 116, but the vial flagged to be addressed as an exception. Alternatively, the gate 116 can be opened to a disposal pathway or chute. If the dispense is taking place in a robot with a capper, the vial may be left uncapped. Although the foregoing discussion is in terms of counting medications into a chute from which they are released into a vial, the systems 100, 200, or 300 work equally well in equipment which counts medications directly into a vial.

Figure 4:
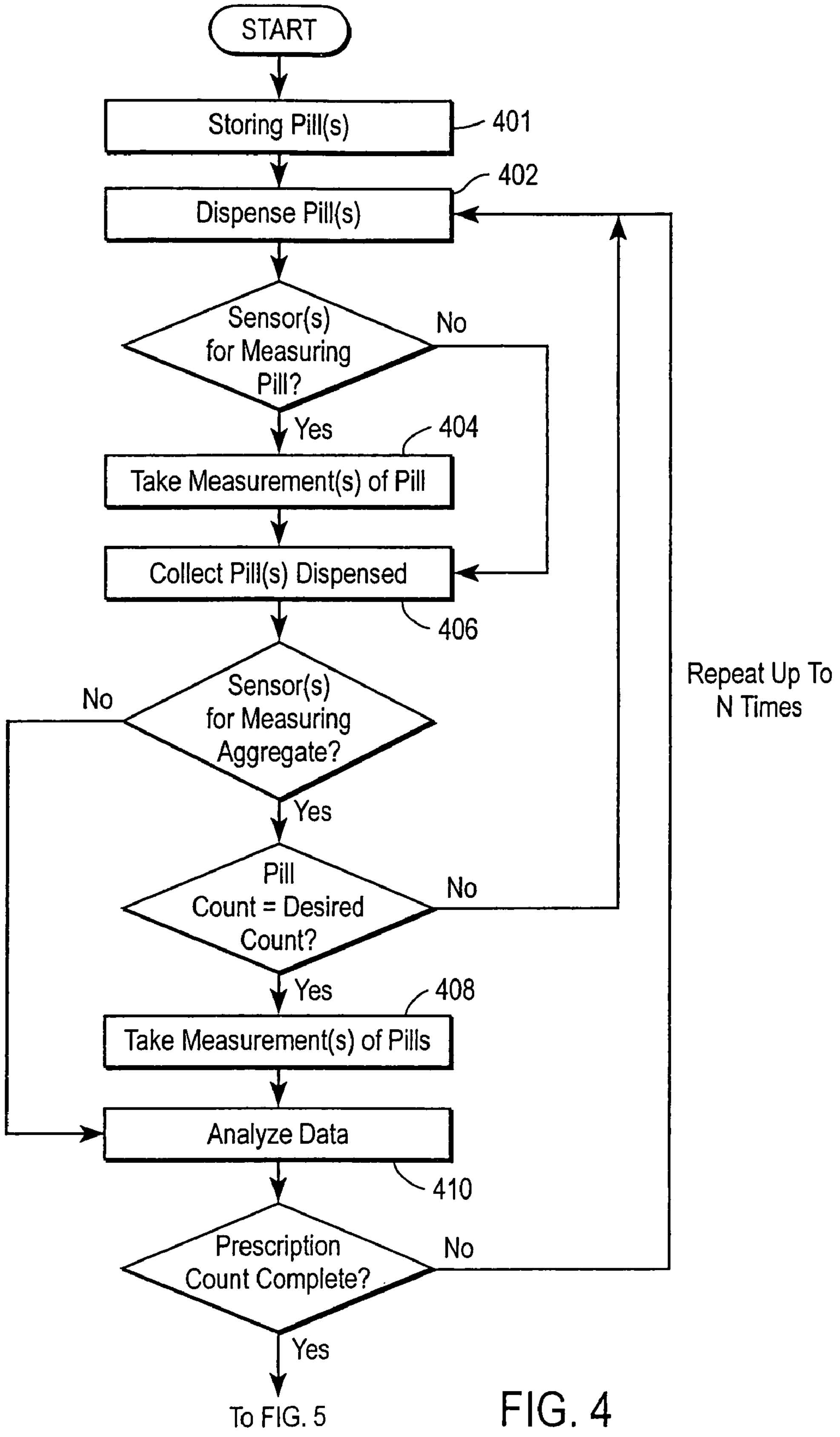
FIG. 4 is a flowchart illustrating steps performed by the drug discrimination system to verify pharmaceutical formulation, dosage, physical characteristics, etc., according to one embodiment of the present invention.

Referring now to FIG. 4, there is shown a flowchart illustrating the operation of drug discrimination systems 100, 200, and 300, according to some embodiments of the present invention. It should be understood that these steps are illustrative only. Different embodiments of a drug discrimination system may perform the illustrated steps in different orders, omit certain steps, and/or perform additional steps not shown in FIG. 4 (the same is true for FIG. 5).

As shown in FIG. 4, the drug discrimination system stores 401 the pill(s) (e.g., in a reservoir 102) and dispenses 402 pill(s) as dictated by the current prescription. The system can dispense 402 numerous pills or it can dispense 402 only one or two pills, depending how the system is configured. If the system has one or more sensors for measuring each pill as the pill is moving through the dispensing area 105 (e.g., if any of the sensors 106, 108 or 202 is such a sensor), then that sensor can be used to take 404 one or more measurements of the pill that was dispensed 402. An example of a sensor for measuring each pill is the E-field sensor (e.g., capacitive sensor) described above that creates an electrostatic field through which each pill moves so that measurements can be taken for every pill passing through the field (rather than or in addition to taking measurements of the pills after they have been added to the aggregate 119). The system can then collect 406 the pill(s) dispensed into the collection area 118. If the system does not have any of the type of sensors for measuring each pill as the pill is moving through the dispensing area 105 (e.g., the system only has sensors for measuring the aggregate 119, such as a camera), the system can move to the step of collecting 406 pill(s) dispensed.

One or more pills can be collected 406 in the collection area 118 so that the collection area 118 contains an aggregate 119 of pills. If the system does not include any of the type of sensors for measuring the aggregate 119 of pills in the collection area 118 (e.g., the system only includes sensors, such as an E-field sensor, for measuring each pill as the pill moves through the dispensing area or through a field generated by the sensor), then the system can analyze 410 the data collected by the sensors involved in measuring each pill which took 404 measurements. In analyzing 410 the data, the system can verify that a characteristic (e.g., formulation, dosage, weight, size, shape, volume, etc.) substantially matches the same characteristic in the pharmaceutical intended to be dispensed in the current prescription (e.g., the formulation matches that of Lipitor® if that is the drug intended to be dispensed, the weight matches a weight model of the pills specified in the prescription, etc.).

If the system does include one or more sensors for measuring the aggregate 119 of pills, the system can determine whether or not the pill count is equal to the desired count. For example, where the sensor(s) are a camera and/or a spectroscopic sensor (e.g., sensors 106 and 108), these sensors take measurements when the pills are at an arbitrary level indicated by "time 1" in FIG. 1. Time 1 can be reached when the actual pill count that has been dispensed into the collection area 118 equals the desired count of pills to be dispensed before a measurement is taken. Thus, if the pill count number does not equal the desired count for collecting data or the aggregate is not yet at the desired level for data collection, then the system is not yet ready to take a measurement, and the system can continue dispensing 402 pills until the pill count has risen to such a level that it equals the desired count or the desired level (e.g., as determined by the pill level detection sensor 110, if one is present). If the pill count does equal the desired count or the level is detected to be the correct level, the system can then take 408 one or more measurements of the aggregate 119 of pills at time 1. In some embodiments, the sensors are focused or calibrated before taking 408 a measurement. Data can then be collected and analyzed 410 and a characteristic verified by the discrimination system 112 or by another analysis mechanism to produce an output 114. For example, the system might analyze 410 the data by comparing the data collected to models for the correct drug.

If the orientation of the aggregate 119 of pills or some other issue prevents both of the sensors (e.g., the camera and the spectrometer) from being able to take a sufficient reading (e.g., the spectrometer and/or the camera cannot determine the formulation or dosage with a high degree of confidence), the system can continue dispensing 402 pills and taking 404/408 more measurements. For example, the system could then wait a short period of time until an arbitrary level of pills at "time 2" is achieved. At "time 2," the pill aggregate 119, as viewed by the sensors, is different than the last time data was collected because additional pills have been added. The sensors could take 408 another measurement. If the aggregate 119 of pills is such that one sensor (e.g., the spectrometer) is able to verify the formulation with a high degree of certainty, but a second sensor (e.g., the camera) cannot get a sufficient reading (e.g., cannot pick up enough identifying feature data to verify dosage), the system could then wait until more pills are added and then collect more data with the second sensor until accurate readings with the second sensor (e.g., the camera) are taken 408 (e.g., until the imaging algorithms could verify the dosage). Similarly, the first sensor (e.g., the spectrometer) can continue to collect data until an accurate reading is taken 408 (e.g., until the data quality is sufficient to verify the formulation with a high degree of certainty).

Figure 5:
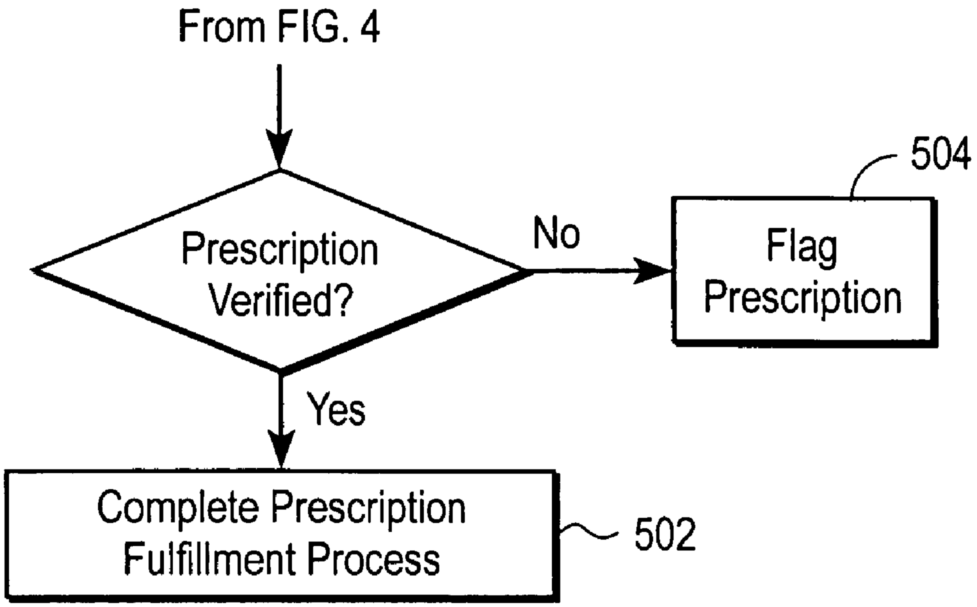
FIG. 5 is a flowchart illustrating a continuation of the steps performed by the drug discrimination system shown in FIG. 4 to verify pharmaceutical formulation, dosage, physical characteristics, etc., according to one embodiment of the present invention.

Referring now to FIG. 5, there is shown a flowchart illustrating a continuation of the operation of drug discrimination systems 100, 200, and 300 shown in FIG. 4, according to some embodiments of the present invention. After a number of pills have been dispensed, the number of pills or level of pills in the pill aggregate 119 will reach the total desired number as specified by the prescription. If the prescription count is not yet complete, the system will continue dispensing pills. The system can continue dispensing 402 pills and can then repeat the method steps to take 408 measurements up to N times (where N is a number equal to 1 or more). If N pills are dispensed, then up to N sets of unique data can be collected. If the prescription count is complete, the system can then determine whether the prescription has been verified (e.g., if the pills being dispensed are the correct pills). If so, the system completes 502 the prescription fulfillment process (e.g., the finishing steps can occur, including capping of the vial and distribution). If the prescription has not been verified, the system can flag 504 the prescription as containing incorrect pills and requiring action to be taken (e.g., the drug might be thrown away, examined, etc.).

As will be understood by those familiar with the art, the invention may be embodied in other specific forms without departing from the spirit or essential characteristics thereof. Likewise, the particular naming and division of the parts of the apparatus are not mandatory or significant, and the mechanisms that implement the invention or its features may have different names, divisions and/or formats. Thus, the previous descriptions of the preferred embodiments should not be construed as invention limitations. As previously stated, the configuration of the invention (e.g., selection of sensors and sensor locations) is flexible as long as it meets the functional requirements. In similar fashion, it is possible to add or subtract sensors, select sensors that perform different functions than those in the examples and change sensor locations. Accordingly, the disclosure of the present invention is intended to be illustrative, but not limiting, of the scope of the invention, which is set forth in the following claims.

We claim:

1. A system for verifying an individual prescription identifying at least one of a formulation and a dosage of pharmaceutical pills during a dispensing process for the individual prescription, the system comprising:

a pill dispensing apparatus for dispensing individual ones of the pills in an individual prescription into and through a dispensing area during the dispensing process;

a pill collection area for collecting the pills dispensed through the dispensing area for the individual prescription, the dispensing area connected between the dispensing apparatus and the collection area, wherein the pills collected in the collection area during the dispensing process form an aggregate to be dispensed in the individual prescription;

at least two sensors adjacent to the dispensing area for taking a plurality of measurements of the aggregate at multiple times during the dispensing process for the individual prescription; and a discrimination system for comparing the plurality of measurements to stored pharmaceutical models to verify that a plurality of characteristics of the aggregate substantially matches the stored pharmaceutical models of pills identified in the individual prescription for at least one of the formulation and the dosage of the pill in the aggregate.

2. The system of claim 1, wherein the sensors comprising the at least two sensors are the same type of sensor.

3. The system of claim 1, wherein the sensors comprising the at least two sensors are different types of sensors.

4. The system of claim 1, wherein the at least two sensors are further configured to take a plurality of measurements of the aggregate at a plurality of times during the dispensing process, each time associated with a different level of the aggregate.

5. The system of claim 1, wherein the at least two sensors are further configured to take a plurality of measurements of the aggregate at a plurality of times during the dispensing process, each time associated with a different count of pills in the aggregate.

6. The system of claim 1, wherein the pill collection area is a temporary holding chute into which the pills are deposited, the chute having a gate, the gate retaining the pills in the chute during the taking of measurements, the gate adapted to open to release the pills into a container.

7. The system of claim 1, wherein the pill collection area is a container into which the pills are deposited during the taking of measurements, the container adapted to contain the pills for distribution to a patient.

8. The system of claim 1, wherein at least one of the at least two sensors is configured for measuring the dosage of the pills.

9. The system of claim 1, wherein at least one of the at least two sensors is configured for measuring the formulation of the pills.

10. The system of claim 1, wherein at least one of the at least two sensors is configured for measuring a size of the pills.

11. The system of claim 1, wherein the at least two sensors comprise a spectrometer and a camera.

12. The system of claim 1, wherein the measurements are taken during the dispensing process at a location substantially adjacent to the pill collection area.

13. The system of claim 1, wherein the measurements are taken during the dispensing process at a point in time substantially near a point in time at which the pills enter the pill collection area.

14. The system of claim 1, wherein at least one of the at least two sensors is configured for measuring a weight of the pills.

15. A method of verifying an individual prescription identifying at least one of a formulation and a dosage of pills during a dispensing process for the individual prescription, wherein measurements are taken with at least two sensors adjacent to a dispensing area that is connected to a pill collection area, the method comprising: dispensing individual ones of the pills in an individual prescription into and through the dispensing area during the dispensing process; collecting in the pill collection area the pills dispensed through the dispensing area for the individual prescription, wherein the pills collected during the dispensing process form an aggregate to be dispensed in the individual prescription; taking a plurality of measurements of the aggregate with the at least two sensors at multiple times during the dispensing process for the individual prescription; and comparing the plurality of measurements to stored pharmaceutical models to verify that a plurality of characteristics of the aggregate substantially matches the stored pharmaceutical models of pills identified in the individual prescription for at least one of the formulation and the dosage of the pill in the aggregate.

16. The method of claim 15, wherein sensors comprising the at least two sensors are same type of sensor.

17. The method of claim 15, wherein sensors comprising the at least two sensors are different types of sensors.

18. The method of claim 15, wherein taking the plurality of measurements further comprises taking measurements of the aggregate at a plurality of times during the dispensing process, each time associated with a different level of the aggregate.

19. The method of claim 15, wherein taking the plurality of measurements further comprises taking measurements of the aggregate at a plurality of times during the dispensing process, each time associated with a different count of pills in the aggregate.

20. The method of claim 15, wherein collecting the pills further comprises collecting the pills in a temporary holding chute into which the pills are deposited, the chute having gate, the gate retaining the pills in the chute during the taking of measurements, the gate adapted to open to release the pills into a container.

21. The method of claim 15, wherein collecting the pills further comprises collecting the pills in a container into which the pills are deposited during the taking of measurements, the container adapted to contain the pills for distribution to a patient.

22. The method of claim 15, wherein comparing the plurality of measurements further comprises verifying that the dosage of the aggregate substantially matches a dosage of the pills identified in the individual prescription.

23. The method of claim 15, wherein comparing the plurality of measurements further comprises verifying that the formulation of the aggregate substantially matches a formulation of the pills identified in the individual prescription.

24. The method of claim 15, wherein comparing the plurality of measurements further comprises verifying that a weight of the aggregate substantially matches a weight model of the pills specified in the individual prescription.

25. The method of claim 15, wherein the at least two sensors comprise a spectrometer and a camera.

26. The method of claim 15, wherein the measurements are taken during the dispensing process at a location substantially adjacent to the pill collection area.

27. The method of claim 15, wherein the measurements are taken during the dispensing process at a point in time substantially near a point in time at which the pills enter the pill collection area.

28. A system for verifying an individual prescription identifying at least one of a formulation and a dosage of pharmaceutical pills during a dispensing process for the individual prescription, the system comprising:

a pill dispensing apparatus for dispensing individual ones of the pills in an individual prescription into and through a dispensing area during the dispensing process;

a pill collection area for collecting the pills dispensed through the dispensing area for the individual prescription, the dispensing area connected between the dispensing apparatus and the collection area, wherein the pills collected in the collection area during the dispensing process form an aggregate to be dispensed in the individual prescription;

at least two sensors adjacent to the dispensing area for taking a plurality of measurements of the pills at multiple times during the dispensing process for the individual prescription, wherein at least one of the at least two sensors is configured to take a measurement of each of the pills as each is moving through the dispensing area and at least one of the at least two sensors is configured to take a plurality of measurements of the aggregate of the pills in the pill collection area during the dispensing process; and a discrimination system for comparing the plurality of measurements to stored pharmaceutical models to verify that a plurality of characteristics of each of the pills substantially matches the stored pharmaceutical models of pills identified in the individual prescription for at least one of the formulation and the dosage of the pill.

29. The system of claim 28, wherein the sensors comprising the at least two sensors are the same type of sensor.

30. The system of claim 28, wherein the sensors comprising the at least two sensors are different types of sensors.

31. The system of claim 28, wherein the pill collection area is a temporary holding chute into which the pills are deposited, the chute having a gate, the gate retaining the pills in the chute during the taking of measurements, the gate adapted to open to release the pills into a container.

32. The system of claim 28, wherein the pill collection area is a container into which the pills are deposited during the taking of measurements, the container adapted to contain the pills for distribution to a patient.

33. The system of claim 28, wherein at least one of the at least two sensors is configured for measuring the dosage of the pills.

34. The system of claim 28, wherein at least one of the at least two sensors is configured for measuring the formulation of the pills.

35. The system of claim 28, wherein at least one of the at least two sensors is configured for measuring a volume of the pills.

36. The system of claim 28, wherein at least one of the at least two sensors is an E-field sensor.

37. The system of claim 28, wherein the measurements are taken during the dispensing process at a location substantially adjacent to the pill collection area.

38. The system of claim 28, wherein the measurements are taken during the dispensing process at a point in time substantially near a point in time at which the pills enter the pill collection area.

39. The system of claim 28, wherein at least one of the at least two sensors is configured for measuring a weight of the pills.

40. A method of verifying an individual prescription identifying at least one of a formulation and a dosage of pharmaceutical pills during a dispensing process for the individual prescription, wherein measurements are taken with at least two sensors adjacent to a dispensing area that is connected to a pill collection area, the method comprising: dispensing individual ones of the pills in an individual prescription into and through the dispensing area during the dispensing process; collecting in the pill collection area the pills dispensed through the dispensing area for the individual prescription, wherein the pills collected during the dispensing process form an aggregate to be dispensed in the individual prescription; taking a plurality of measurements of the pills with the at least two sensors at multiple times during the dispensing process for the individual prescription, wherein at least one of the at least two sensors is configured to take a measurement of each of the pills as each is moving through the dispensing area and at least one of the at least two sensors is configured for taking a plurality of measurements of the aggregate of the pills in the pill collection area during the dispensing process; and comparing the plurality of measurements to stored pharmaceutical models to verify that a plurality of characteristics of each of the pills substantially matches the stored pharmaceutical models of pills identified in the individual prescription for at least one of the formulation and the dosage of the pill.

41. The method of claim 40, wherein sensors comprising the at least two sensors are same type of sensor.

42. The method of claim 40, wherein sensors comprising the at least two sensors are different types of sensors.

43. The method of claim 40, wherein collecting the pills further comprises collecting the pills in a temporary holding chute into which the pills are deposited, the chute having gate, the gate retaining the pills in the chute during the taking of measurements, the gate adapted to open to release the pills into a container.

44. The method of claim 40, wherein collecting the pills further comprises collecting the pills in a container into which the pills are deposited during the taking of measurements, the container adapted to contain the pills for distribution to a patient.

45. The method of claim 40, wherein comparing the plurality of measurements further comprises verifying that the dosage of the pills substantially matches a dosage of the pills identified in the individual prescription.

46. The method of claim 40, wherein comparing the plurality of measurements further comprises verifying that the formulation of the pills substantially matches a formulation of the pills identified in the individual prescription.

47. The method of claim 40, wherein comparing the plurality of measurements further comprises verifying that a volume of the pills substantially matches a volume of the pills identified in the individual prescription.

48. The method of claim 40, wherein comparing the plurality of measurements further comprises verifying that an amount of fragmentation of the pills is below an acceptable amount of fragmentation of the pills identified in the individual prescription.

49. The method of claim 40, wherein the at least one of the at least two sensors is an E-field sensor.

50. The method of claim 40, wherein the measurements are taken during the dispensing process at a location substantially adjacent to the pill collection area.

51. The method of claim 40, wherein the measurements are taken during the dispensing process at a point in time substantially near a point in time at which the pills enter the pill collection area.

* * * * *